United States Patent [19]

Hunter

[11] 3,891,494

[45] June 24, 1975

[54] PRICKER ROLL

[75] Inventor: Edward E. Hunter, Akron, Ohio

[73] Assignee: The Goodyear Tire & Rubber Company, Akron, Ohio

[22] Filed: Apr. 26, 1973

[21] Appl. No.: 354,575

[52] U.S. Cl. .................... 156/437; 83/678; 156/87; 156/179; 156/252; 156/513; 264/175; 425/290
[51] Int. Cl. ...................... B29h 9/04; B32b 25/02
[58] Field of Search ........... 156/178, 179, 252, 436, 156/437, 513, 405, 500, 501, 553, 555; 425/290, 297, 313; 83/678, 346, 347; 264/175, DIG. 70

[56] References Cited
UNITED STATES PATENTS

| 2,001,575 | 5/1935 | James | 156/437 |
|---|---|---|---|
| 2,186,771 | 1/1940 | Smith | 156/437 |
| 3,161,554 | 12/1964 | Blackford | 156/252 |
| 3,318,266 | 5/1967 | Rich et al. | 425/290 |
| 3,744,404 | 7/1973 | Eisendrath | 425/290 |
| 3,779,834 | 12/1973 | Appleby et al. | 156/513 |

OTHER PUBLICATIONS

A.P.C. Application of Grabec, Ser. No. 163,602, published May 11, 1943, Class 156, Subclass 500.

Primary Examiner—Daniel J. Fritsch
Attorney, Agent, or Firm—F. W. Brunner; H. E. Hummer

[57] ABSTRACT

A pricker roll used with a machine for calendering reinforcement tire cords with rubber material. The pricker roll produces a pattern of cuts in the thin sheets of rubber material to allow the escapement of air entrapped in the material during the sheet-forming process.

20 Claims, 4 Drawing Figures

PATENTED JUN 24 1975 3,891,494

PRICKER ROLL

BACKGROUND OF THE INVENTION

The invention is particularly well suited for use in building tires from rubber material reinforced with wire cords, especially in the calendering operation where the wire tire cords are embedded in the unvulcanized rubber material. Two masses of unvulcanized rubber material are drawn between the nips of two pairs of rollers to form the rubber material into two thin sheets for calendering the wire tire cords. Occasionally, air becomes trapped in the rubber material during this sheet-forming operation. The air bubbles, thus created, must be eliminated since they can cause misorientation of the wire cords during the calendering process. This can be accomplished by continually pricking the sheets of unvulcanized rubber material to allow the escapement of air. Pricker rolls are provided for this purpose and have been used in the past to place a pattern of small circular holes in the thin sheets of unvulcanized rubber material. This particular pattern of cuts, however, has not proved effective in eliminating entrapped air. The invention is directed to providing a highly improved pattern of slots or cuts in the thin rubber sheets used in calendering wire tire cords.

Briefly stated, the invention is in a calender for embedding tire cords in rubber material. The calender comprises at least one rotatable roll for pricking a pattern of configured openings in sheets of rubber material, prior to contact with the tire cords. The roll includes a plurality of teeth which extend in spaced relation from the roll for piercing the rubber material. Each tooth is designed for cutting an elongated slot having its longitudinal axis angularly disposed to the longitudinal axis of the cord reinforced material being formed, or the longitudinal axis of the parallel cords being embedded in the rubber material.

DESCRIPTION OF THE DRAWING

The following description of the invention will be better understood by having reference to the annexed drawing, wherein.

DESCRIPTION OF THE INVENTION

Figure 1:
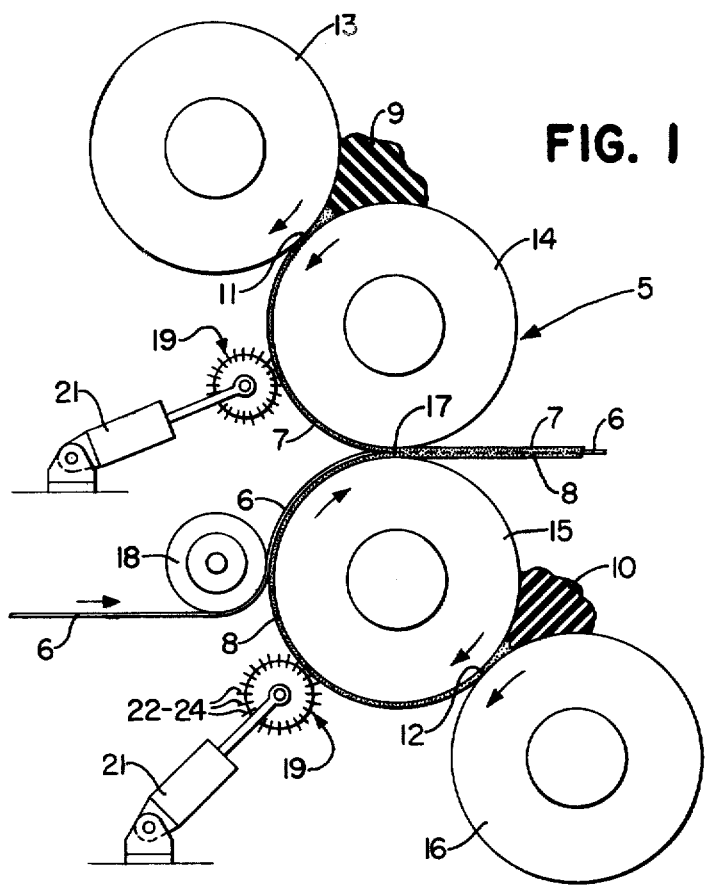
FIG. 1 is a side view of the various rolls essential for calendering tire cords with rubber, and shows the location of the pricker rolls in relation thereto.

Referring particularly to FIG. 1, there is shown a calender 5 for embedding a number of tire cords, e.g. wire 6, in parallel array between two opposing sheets 7 and 8 of unvulcanized rubber material used in the production of tires. The thin sheets 7 and 8 of rubber material are formed by moving masses 9 and 10 of rubber stock through the nips 11 and 12 of two pairs of calender rolls 13 and 14, and 15 and 16, respectively. The thin sheets 7 and 8 of rubber material are then moved through the nip 17 formed between the opposing pair of calender rolls 14 and 15. The tire cords 6 are taken in parallel array from a conventional creel and passed around a small roller 18 prior to moving them between the nip 17 where the tire cords and thin sheets 7 and 8 of rubber material are pressed firmly together to form, for example, breaker or belt ply stock used to annularly reinforce a bias-belted or radial tire. A pair of similarly designed pricker rolls 19 are provided for placing a pattern of cuts, e.g. slot 20, in the thin sheets 7 and 8 of rubber material, just prior to the sheets contacting the tire cords 6. Any suitable means such as an air cylinder 21 may be used to reciprocate the pricker rolls 19 into and out of engagement with the thin sheets 7 and 8 of rubber material on the adjacent calender rolls 14 and 15.

Figure 3:
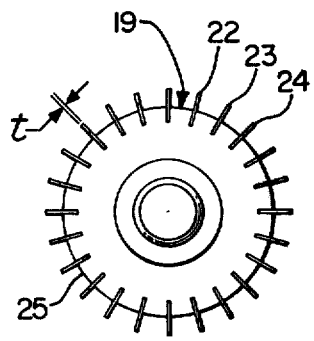
FIG. 3 is an end view of the pricker roll.
Figure 2:
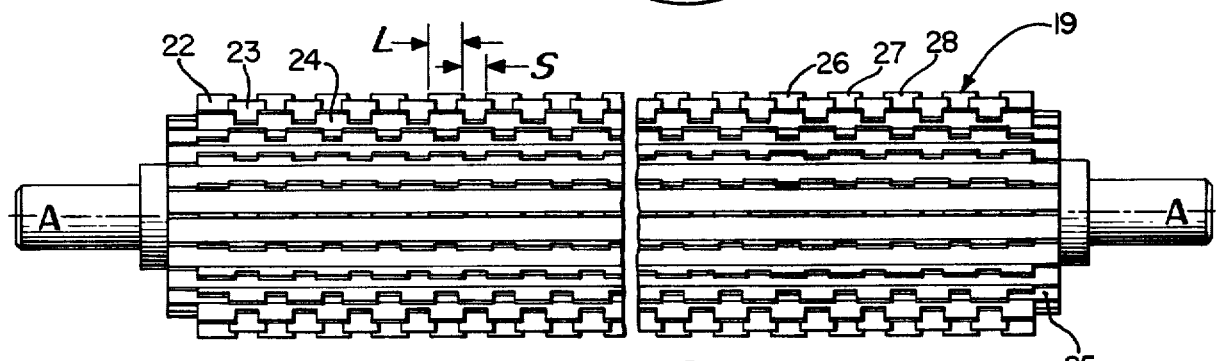
FIG. 2 is a side view of a pricker roll made in accordance with the invention.

The pricker rolls 19, as best seen in FIGS. 2 and 3, each comprise a plurality of blades, e.g. blades 22, 23, and 24, which extend longitudinally of the pricker roll 19 and radially from the outer periphery 25 of the pricker roll 19. The blades 22–24 preferably lie in radial planes containing the longitudinal axis A-A of the pricker rolls 19. The blades may be spiralled about the pricker rolls 19, but such an embodiment would be considerably more expensive to manufacture. The blades are equally angularly spaced about the longitudinal axes A-A of the pricker rolls 19 to produce a continuing pattern of slots in the sheets 7 and 8 of rubber material. It has been found beneficial using from 16 to 32 blades spaced equally around the outer periphery 25 of the rolls 19.

Figure 4:
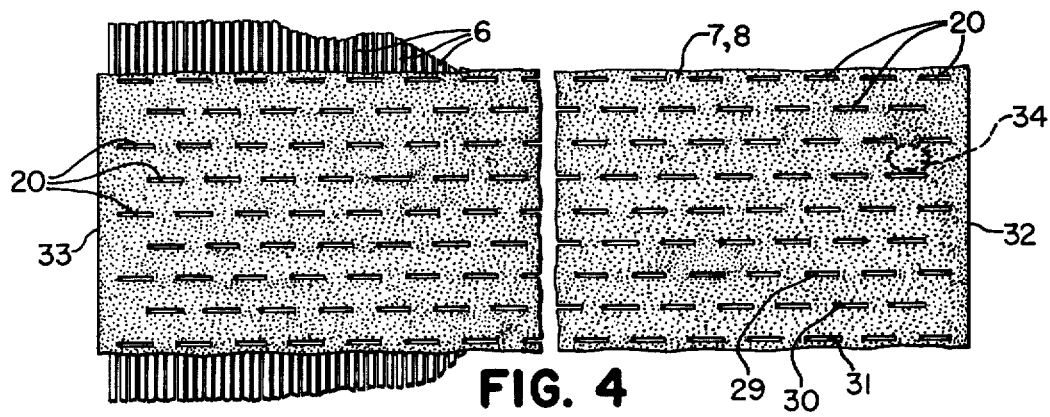
FIG. 4 is a small portion of a sheet of rubber material, illustrating the particular pattern of cuts or slots formed by the pricker roll.

The blades 22–24 each comprise a set of spaced teeth, e.g. the teeth 26–28 of blade 22. The teeth of adjacent blades, as best seen in FIG. 2, are staggered and cut correspondingly staggered slots, e.g. slots 29–31 in the sheets 7 and 8 of rubber material, as best seen in FIG. 4, such that the elongated, rectangular slots of alternate rows of slots will be in crosswise alignment parallel to the longitudinal axis, or edges 32 and 33 of the particular sheet of rubber material in which the pattern of slots is being cut. Accordingly, the teeth of alternate rows of teeth will be in crosswise alignment in planes normal to the rotational axis of the pricker roll 19. The length L of each tooth is made greater than the spacing S between adjacent teeth to provide a series of staggered slots which are overlapping in a lengthwise or axial direction. A good, workable arrangement is teeth having a length L of one-half inches spaced three-eighths inches apart. The thickness t of each tooth is sufficient to displace rubber material and produce a slot or slit which will not close immediately after it is cut, but where there is adequate displaced material to close the individual slots as the slotted material passes through the nip 17 between the main calender rolls 14 and 15. Teeth with a thickness $t$ of one thirty-second inches, have been used and found suitable for this purpose. It is theorized that a bubble 34 of air (FIG. 4) entrapped in the rubber material during the sheet-forming process, will be forced back to an adjacent slot, as the rubber material is compressed between the nip of the calender rolls, where the entrapped air will escape into the ambient atmosphere. The teeth of each blade are designed to produce a rectangular shaped slot which will remain at least partially open throughout its length L to provide overlapping escapements for the entrapped air. However, it is important that the slots close during the calendering operation and leave no wire cords bare and exposed to the ambient atmosphere.

Thus, there has been provided an improved pricker roll for placing a better pattern of rubber material used in calendering tire cords for reinforcing tires. The cuts are elongated and rectangular in shape making them less susceptible to closing as the pricked rubber material attempts to resume its original shape.

What is claimed is:

1. A calender for embedding reinforcement cords in rubber material, comprising at least one rotatable roll for pricking configured openings in the rubber material prior to the contact of the material with the cords, the roll including a plurality of rows of spaced teeth extending from the roll for piercing the rubber material, the rows of teeth being spaced around the roll and extending longitudinally thereof, each tooth being designed to cut, in the rubber material, an elongated slot having its longitudinal axis angularly disposed to the longitudinal axis of the cord-reinforced material being formed, the teeth of adjacent rows being staggered longitudinally of the roll so as not to be in crosswise alignment, and the teeth of alternate rows at least spanning the spacing(s) between the teeth of rows therebetween.

2. The calender of claim 1, wherein each row of teeth is in spiralled relation about the longitudinal axis of the roll.

3. The calender of claim 1, wherein the teeth of alternate rows are in crosswise alignment in planes normal to the rotational axis of the roll, and each tooth is designed to cut an elongated, rectangularly shaped slot.

4. The calender of claim 3, wherein the teeth of adjacent rows overlap each other longitudinally, such that the slots formed in the rubber material, are longer in a lengthwise direction than the spacings between adjacent slots of the same row.

5. The calender of claim 4, wherein the teeth lie in planes which contain the longitudinal axis of the pricker roll.

6. The calender of claim 5, which includes means for reciprocating the roll into and out of pricking engagement with the rubber material.

7. The calender of claim 1, which includes rows of blades extending longitudinally of the roll and radially from the outer periphery of the roll, each blade including a set of spaced teeth, the rows of blades being equally spaced around the outer periphery of the roll.

8. The calender of claim 7, wherein the teeth of adjacent blades are longitudinally staggered and the length of each tooth, measured longitudinally of the roll, is greater than the spacing between adjacent teeth of each blade.

9. The calender of claim 8, wherein the blades lie in planes which contain the longitudinal axis of the roll.

10. The calender of claim 9, which includes means for reciprocating the roll into and out of pricking engagement with the rubber material.

11. A pricker roll, positioned adjacent a calender, for cutting a pattern of slots in a sheet of rubber material used in calendering cords for reinforcing said material, comprising:
   a. an elongated roll having a cylindrical outer periphery;
   b. means mounting the roll for rotation about its longitudinal axis;
   c. a plurality of rows of teeth equally spaced around the outer periphery of the roll, each of the rows including a plurality of spaced teeth extending from the roll, each tooth being elongated and having its longitudinal axis angularly disposed to a plane normal to the longitudinal axis of the roll, the teeth of adjacent rows being staggered longitudinally of the roll so as not to be in crosswise alignment, and the teeth of alternate rows at least spanning the spacing(s) between the teeth of rows therebetween.

12. The pricker roll of claim 11, wherein each tooth is in a radial plane containing the longitudinal axis of the roll.

13. The pricker roll of claim 12, wherein each tooth has a rectangular cross-section in a plane parallel to the longitudinal axis of the roll.

14. The pricker roll of claim 11, wherein each row of teeth is in slightly spiralled relation about the longitudinal axis of the roll.

15. The pricker roll of claim 13, wherein the teeth of alternate rows are in crosswise alignment.

16. The pricker roll of claim 15, wherein the teeth of adjacent rows are overlapped lonitudinally of the roll to be in crosswise overlapping relation.

17. The calender of claim 4, which includes at least one pair of calender rolls disposed in spaced relation for forming a thin sheet of rubber material therebetween; means for positioning the pricker roll adjacent the calender roll against which the thin sheet of rubber material clings; and means for mounting the pricker roll and calender rolls for rotation about parallel axes.

18. The calender of claim 17, which includes: a second pair of calender rolls for forming a second sheet of rubber material therebetween; means for positioning a second pricker roll adjacent the roll, of said second pair of calender rolls, against which the second sheet of rubber material clings; and means for mounting the second pricker roll and second pair of calender rolls for rotation about parallel axes.

19. The calender of claim 18, which includes: means for moving the thin sheets of rubber material into juxtaposition; means for guiding the reinforcement cords in parallel array between the juxtaposed sheets of rubber material; and means for compressing the sheets of rubber material against each other, and the reinforcement cords therebetween.

20. The calender of claim 8, wherein each blade is slightly spiralled about the longitudinal axis of the roll.

* * * * *